United States Patent
Byers et al.

(10) Patent No.: US 6,987,841 B1
(45) Date of Patent: Jan. 17, 2006

(54) METHOD FOR PROVIDING A PHONE CONVERSATION RECORDING SERVICE

(75) Inventors: Simon D. Byers, Summit, NJ (US); Howard Paul Katseff, Marlboro, NJ (US); David P. Kormann, Morristown, NJ (US); Kermit Hal Purdy, Bernardsville, NJ (US); Vaidyanathan Ramaswami, Neshanic Station, NJ (US)

(73) Assignee: AT&T Corp., New York, NY (US)

( * ) Notice: Subject to any disclaimer, the term of this patent is extended or adjusted under 35 U.S.C. 154(b) by 323 days.

(21) Appl. No.: 10/411,701

(22) Filed: Apr. 11, 2003

Related U.S. Application Data (63) Continuation-in-part of application No. 10/001,614, filed on Oct. 31, 2001, now abandoned.

(60) Provisional application No. 60/399,049, filed on Jul. 26, 2002, provisional application No. 60/246,655, filed on Nov. 8, 2000.

(51) Int. Cl.
*H04M 1/00* (2006.01)

(52) U.S. Cl. .................. 379/88.17; 379/68; 379/93.01

(58) Field of Classification Search ............... 379/67.1, 379/68, 84, 85, 88.19, 88.25, 88.27, 114.01, 379/201.01, 202.01, 203.01, 88.17, 93.01
See application file for complete search history.

(56) References Cited

U.S. PATENT DOCUMENTS

| | | | |
|---|---|---|---|
| 5,535,262 A | 7/1996 | Kanzawa | 379/67 |
| 5,544,231 A | 8/1996 | Cho | 379/67 |
| 5,710,591 A | 1/1998 | Bruno et al. | 348/15 |
| 5,974,449 A | 10/1999 | Chang et al. | 709/206 |
| 6,222,909 B1 | 4/2001 | Qua et al. | 379/88.22 |
| 6,404,878 B1 | 6/2002 | Jackson et al. | 379/221.01 |
| 6,529,602 B1 * | 3/2003 | Walker et al. | 380/283 |
| 6,658,092 B1 * | 12/2003 | Gusler et al. | 379/68 |
| 6,778,639 B2 * | 8/2004 | Gusler et al. | 379/68 |
| 6,792,093 B2 * | 9/2004 | Barak et al. | 379/202.01 |
| 2004/0131161 A1 * | 7/2004 | Schwartz et al. | 379/68 |

FOREIGN PATENT DOCUMENTS

WO    WO 98/39901    * 9/1998

* cited by examiner

*Primary Examiner*—Ovidio Escalante (57) ABSTRACT

The present invention is a method and system for recording a communication over a public network upon the request of a communicating party. The request is received for the recording service from a first communicating party and an identification number, received from the first communicating party, is verified. A number is received for a second communicating party from the first communicating party and a connection for a communication between the first and second communicating parties is established. Finally a recording of the communication is made and, after the completion of the communication is detected, the recording is converted to a standard audio file. The system may provide additional information with the recording, such as a time/date stamp and the telephone numbers associated with the communication, in order to authenticate the call.

3 Claims, 8 Drawing Sheets

METHOD FOR PROVIDING A PHONE CONVERSATION RECORDING SERVICE

CROSS REFERENCE TO RELATED APPLICATION

This patent application is a continuation-in-part from and claims the benefit of priority of U.S. patent application Ser. No. 10/001,614 "Authentication Of Communications With Recordings Storage and Playback", V. Ramaswami, filed Oct. 31, 2001, now abandoned, which claims the benefit of priority to U.S. Provisional Patent Application No. 60/246,655 filed on Nov. 8, 2000. This application claims the benefit of priority to U.S. Provisional Patent Application No. 60/399,049 filed on Jul. 26, 2002, the specification of which is hereby incorporated by reference herein.

FIELD OF THE INVENTION

The present invention relates generally to consumer communications services such as telephone services and, more particularly, to a consumer service for recording communications.

BACKGROUND OF THE INVENTION

Service providers such as credit card companies and insurance companies routinely record telephone conversations with customers. The recordings are a record of the conversation that may later be used to verify information obtained during the conversation or to provide evidence where there is a dispute regarding the substance of the conversation. A reciprocal recording facility, however, is not readily available to the individual caller who calls the service provider. At best, an individual caller may record the conversation using home recording equipment attached to the telephone. The ability to record such telephone conversations is therefore limited to individuals who own home recording equipment and have set up the equipment to record telephone conversations. There is therefore a need for a consumer telephone service providing individuals with the ability to record telephone conversations on demand without investing in and setting up home recording equipment. There is also a need for such a service for businesses that do not wish to invest in a recording system of their own but would record using a network-based service.

It is known in the art to record an audio conference call by connecting a computer to one of the ports of an audio bridge carrying the conference. In contrast to a point-to-point connection between subscribers through a local central office or a main switching station, a connection over an audio bridge mixes multiple inputs and feeds back a composite audio to each station through ports on the audio bridge. U.S. Pat. No. 5,710,591, entitled "Method and Apparatus for Recording and Indexing an Audio and Multimedia Conference," discloses a system wherein the audio switching capability of an audio bridge is used to identify speakers during the conference and to create an indexed recording of the conference including the identity of the speakers. Audio teleconferencing, however, must be set up well in advance, is expensive and is unavailable to many telephone subscribers. Recording a telephone call using a signal from an audio bridge is therefore not a viable solution for individual subscribers wishing to record occasional telephone calls made over point-to-point connections using the Public Switched Telephone Network (PSTN). As used herein, a "point-to-point" connection is a physical or a virtual connection directly linking stations over wires, coaxial cable, fiber, wireless transmission, microwave links, satellite links and switching/central office equipment. In contrast, an audio bridge links multiple stations over a mixing device.

In order for a recording of a telephone conversation to be effective as evidence in a dispute, the authenticity of the recording must be provable. For example, it would be useful to have the details of a call, such as the date, time and duration of the call, the calling number and the called number, to be available for retrieval in association with the recording. Home recording equipment would not be likely to have the capability to associate information such as date and time with the recording in a verifiable manner. Furthermore, in many cases, custody of the recording and the associated data by either the individual caller or the called party would render the integrity of the recording suspect. A party may also wish to document the refusal of another party to permit the recording of a communication. There is therefore an additional need for an individual caller to be able to authenticate a recording of a telephone conversation by verifiably recording relevant data associated with the conversation, and for custody of the recording to be with an uninterested third party to the conversation.

There is a need for a secure and trusted third party to authenticate the caller and the called party number and to provide secure archive storage for the recorded conversation. Furthermore, it would be desirable to distribute a digitally signed copy of the conversation including the associated information in one of several standard audio formats from a secure server via e-mail, downloadable from a universal resource locator (URL) on the secure server, or from the secure server in a streaming audio format.

SUMMARY OF THE INVENTION

The present invention addresses those needs by providing a service for recording and playing back a communication without the need for additional on-premises customer equipment. Because the service is offered as part of a consumer network service, it is available to any individual or organization having access to the network. The service can provide authenticated proof of the communication, identification of the communicating parties and authenticated copies of the recording.

In one method of the present invention for use in a telecommunications system in which recording services are provided, a request is received for the recording service from a first communicating party and an identification number, received from the first communicating party, is verified. A number is received for a second communicating party from the first communicating party and a connection for a communication between the first and second communicating parties is established. Finally a recording of the communication is made and, after the completion of the communication is detected, the recording is converted to a standard audio file.

After registering at a Web site, a first communicating party connects to the Web site (e.g., by using a toll free number to connect to the Web site server) requesting that a communication be recorded. As used herein, the "first party" is the communicating party requesting that a communication be recorded (also referred to as the calling party), and the "second party" is the other communicating party (also referred to as the called party). A phone number for the second communicating party is received at the Web site from the first communicating party. The Web site conferences the two parties together and bridges in a recording service using facilities in a telecommunications system. A recording of the communication is then made, and the recording is converted to a standard audio file.

The message record may be a standardized message record for purposes of providing telecommunications services; for example, it may be an Automatic Message Account (AMA) message record. Furthermore, the telecommunications system may be a PSTN, and the signal may be an in-band signal.

The recording of the communication may take place at a network node. The message record may be used in billing for the recording or in billing for the communication. In the case where the communication is a telephone call, the signal requesting that the communication be recorded may be a prefix dialed before a dialed telephone number, may simply be a dialed number, or may be a dialed code that is received after the first and second communicating parties are connected. An announcement may be played to at least one of the communicating parties indicating that the conversation is being recorded.

The method may include storing authentication data associated with the recording in a recording record. The authentication data may include a date and time of the communication or may include telephone numbers associated with the communication. The authentication data may also include a unique identification code.

The method may also include providing access to the recording of the signal to the first communicating party upon request. The access may be to a text transcript of the recording, an audio file of the recording or streaming data representing the recording. The access may be to the authentication data, including a text version of the authentication data. Before providing access, the method may first receive from the party a unique identification code identifying the recording or may provide indexing information to facilitate said access.

Before making the recording, the system may receive from the second communicating party an authorization to record the communication. A response to that request may be included in a recording record.

A class of communications to be recorded may be defined by receiving from one of the communicating parties at least one criterion. Then, for each communication for which a connection is established to the communicating party, it is determined whether the communication is within the class of communications defined by the criterion, and a recording is made only if the communication is within the defined class of communications.

Another embodiment of the invention is a method of recording a communication between first and second communicating parties distributed over a communications network. In that method, a request is received from one of the first and second parties over the communications network to initiate a communication with the other of the parties. The communication is initiated between the first and second parties. During the communication, a request to record the communication is received from the first party over the communications network at a site remote from the first and second parties. A signal representing the communication between the first and second parties is received through the communications network, and a recording is made of the signal.

The communication may be a telephone call, in which case the request to record the communication may be an in-band signal. A recording may be played to at least one of the communicating parties indicating that the conversation is being recorded. Authentication data associated with the recording may be stored; the authentication data may include a date and time of the communication, at least one telephone number associated with the communication, or a unique identification code.

Access to the recording of the signal may be provided to the first communicating party upon request. That access may include access to a text transcript of the recording, an audio file or streaming data.

Authentication data may be associated with the recording, where access is provided to the authentication data, including, in one embodiment, a text version of the authentication data. Before access to the recording is provided, a unique identification code identifying the recording may first be received from the first communicating party. Indexing information may be provided to facilitate access.

Before the recording is made, an authorization to record the communication may be requested from at least one communicating party, and the recording may include a response to the request for authorization.

In yet another embodiment of the invention, a method of recording a portion of an ongoing telephone conversation between first and second parties distributed over a communications network includes first receiving from the first party during the course of the telephone conversation a request to record a remaining portion of the telephone conversation. A signal representing the telephone conversation between the first and second parties is then received through the communications network at a site remote from the first and second parties. A recording is made of the signal.

The request to record a remaining portion of the telephone conversation may be an in-band signal. An announcement may be played to the second party indicating that the conversation is being recorded. The method may include storing authenticating data associated with the recording. Access to the recording of the signal may be provided to the first party upon request.

The method may include generating a message record including a record that the telephone conversation was recorded. That message record may be used in billing for the recording or in billing for the telephone conversation.

These and other advantages of the invention will be apparent to those of ordinary skill in the art by reference to the following detailed description and the accompanying drawings.

DETAILED DESCRIPTION OF THE INVENTION

As used herein, the term "standard audio file" refers to a file representing an audio recording which can optionally be encoded using encoding standards including, but not limited to, MP3 format, RealAudio® format of Realnetworks, Inc., and Windows Media™ Audio format of Microsoft Corporation.

Figure 1:
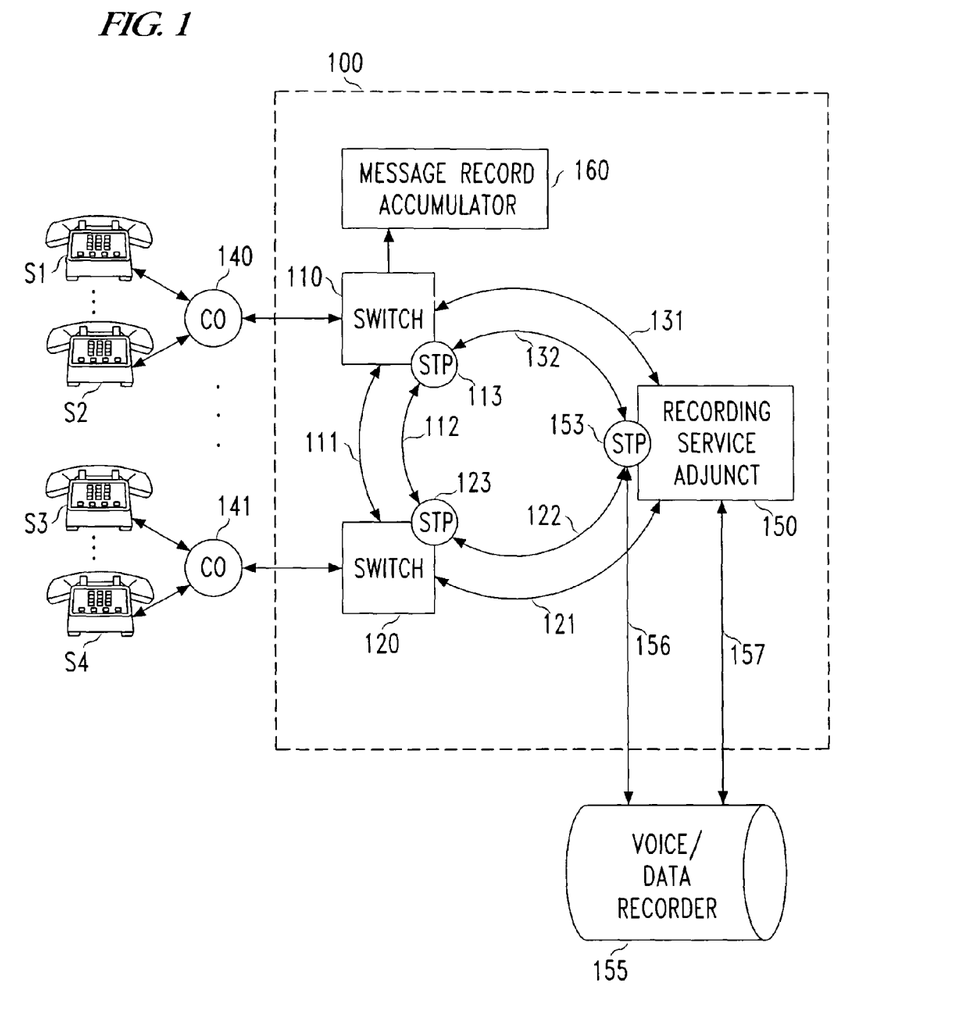
FIG. 1 sets forth an example of a system architecture illustrating one embodiment of the present invention.

An exemplary system for recording a telephone conversation in accordance with the present invention utilizes a public switched communications network 100, shown in FIG. 1, such as the well-known AT&T long distance telephone network. In this example, the network provides long distance telephone services for its subscribers, including the subscribers associated with telephone stations S1 through S4. The communications network 100 includes network switches such as switches 110, 120. In the exemplary embodiment, the switches 110, 120 are switching offices interconnected to each other and to other switching offices via a so-called inter-toll network e.g., 111, 121, 131.

Each switch in the exemplary network is also connected to a number of central offices such as central offices 140, 141. The operation of a central office is well known and will not be discussed in detail herein. A central office is arranged to send to an associated switch of a network 100 a telephone call originated at a calling telephone station set (herein the calling party or the subscriber), e.g., S1, that has dialed a particular long distance telephone number. A central office is also arranged to connect to a telephone station set (herein the called party), e.g., S4, a call that the central office receives from an associated switch.

The network 100 preferably includes an out-of-band signaling system for setting up calls and for providing transaction and other capabilities for subscribers such as caller ID, call waiting and messaging services. The out-of-band signaling architecture includes signal transfer points (STPs) 113, 123, 153 that function as packet switches for routing signaling messages in the signaling system. The STPs are interconnected by a signaling system network 112, 122, 132. The out-of-band signaling system may also extend (not shown) to the central offices 140, 141 and subscriber stations sets S1–S4. A preferred example of an out-of-band signaling system is the ITU Signaling System 7 (SS7), which is a protocol for a form of packet switching that has been generally accepted by the telecommunications industry. The SS7 protocol uses destination routing, octet-oriented fields, variable-length messages and a maximum message length allowing for 256 bytes of data.

Transactional message records of the network 100 are stored by a message record accumulator 160, connected to one or more network switches such as switch 110. The message record accumulator 160 collects relevant data, such as billing data, for each call connected over the network 100. The relevant data collected by the message record accumulator 160 is preferably a standardized message record that may be used by other elements of the network for purposes other than accessing a recording.

In a typical data recordation system used in a public switched telephone network, relevant data such as billing data is recorded for each toll call, or connection, in a so-called automatic message account, or AMA, message record. Typical message record fields are the originating and terminating telephone numbers and elapsed time of call. In a typical system, the message records, which are created for each call at a time substantially contemporaneous with the termination of the call, are transmitted from an originating switch to a message accumulation system such as accumulator 160. The latter distributes the accumulated messages to appropriate further processing systems that translate the AMA message records into the industry-standard "exchange message interface," or EMI, message record format. The EMI records are thereupon forwarded to a rating system that, inter alia, computes the toll charges applicable to the calls and adds an indication of those charges to the EMI record. The records thus formed are forwarded to a billing system in which they reside until processed to generate, typically, "hard copy" bills that are mailed to subscribers.

A recording service adjunct 150 is included in the communications network 100. The adjunct 150 operates, in accordance with the invention, to process calls to or from a party according to instructions received from the party. The recording service adjunct may send and receive voice signals via the inter-toll network 121, 131, and may also send and receive signaling messages via the out-of-band network 122, 132 and signal transfer point 153.

Associated with the recording service adjunct is voice/data recorder 155 that may be external to the network 100 and is connected thereto via the recording service adjunct 150, as shown in FIG. 1, or via another switch such as switches 110, 120. The voice recorder is capable of sending and receiving voice signals representing a telephone conversation through a voice network portion 156 and can also send and receive other messages related to the signal via an out-of band network portion 157. The voice/data recorder 155 includes a storage facility for recording and storing the voice signals and other information for later retrieval. The voice/data recorder 155 may have similarities in construction and operation to a conventional voice messaging service as is known in the art. A conventional voice messaging service receives a voice message from a calling party via the network 100 and stores the message in digital or analog form for retrieval by a called party that was unavailable at the time a call was placed. In one embodiment of the present invention, the voice recorder 155 functions to record voice messages in the manner known in the art, as well as to perform the telephone conversation recording functions described herein.

In practice, two or more of the components including the recording service adjunct 150, the voice data recorder 155 and the message record accumulator 160 may be collocated at a common network node. It is furthermore likely that a plurality of each component would be deployed in a network.

Figure 2:
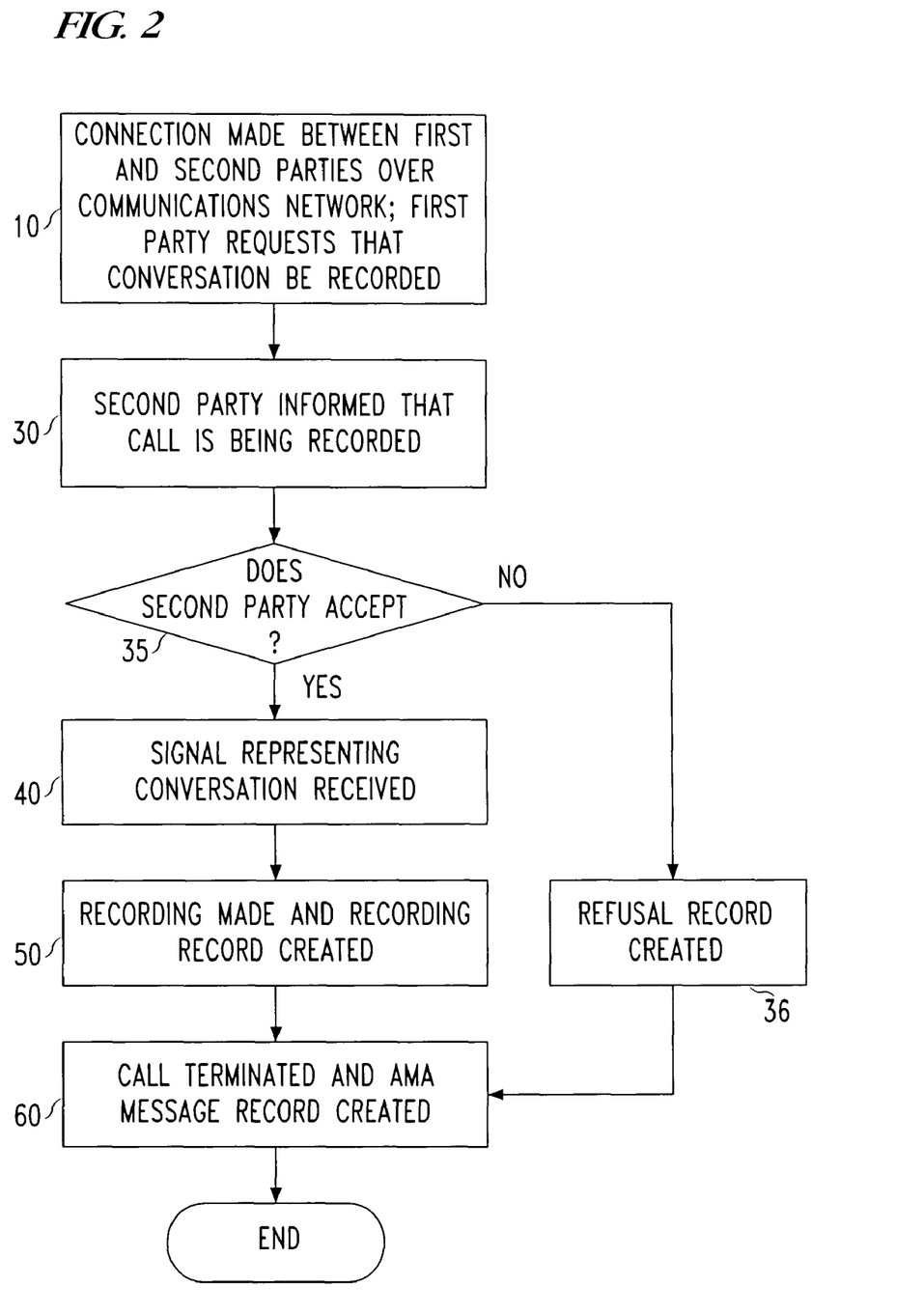
FIG. 2 sets forth a diagram of a communication recording service method illustrating an embodiment of the present invention.

In an exemplary method according to the invention, shown in FIG. 2, a connection is established between first and second parties, and the first party initiates the recording of a conversation by requesting over the communications network that the conversation be recorded (step 10). The request that the conversation be recorded is made by the first party through a network connection to the recording service adjunct 150.

The connection between the first and second parties is established by network switches such as switches 110, 120 and STPs such as STPs 113, 123, 153 of the network 100 (FIG. 1). The calling party identifies the intended called party to the network, for example, by dialing a telephone number associated with the called party.

The connection between the first and second parties may be established either before or after the first party requests that the conversation be recorded. To illustrate this, alternative embodiments of step 10 of FIG. 2 are described below with reference to FIG. 3a, FIG. 3b and FIG. 3c.

In the embodiment of step 10a (FIG. 3a), the first party requests that the conversation be recorded before the call is connected to the second party. That embodiment is used in cases where the first party is the calling party and knows ahead of time that he or she will make an audio record of the call. The first party dials a telephone number assigned to the recording service adjunct 150, such as an "800" number. The network 100, in response to the digits of the telephone number, establishes a connection between the subscriber station S1 and the recording service adjunct 150 through switch 110 (step 11). The first party signals the recording service adjunct 150 that a subsequent call is to be recorded (step 12). The signal that the conversation is to be recorded may simply be the act of connecting to the recording service adjunct 150. Alternatively, the out-of-band signaling system 113, 123, 153, or an in-band signal, may be used by the first party to send a message to the recording service adjunct 150 specifically requesting that a subsequent conversation or a plurality of subsequent conversations be recorded. The first party may be presented with a menu of available services from which to choose.

Figure 3A:
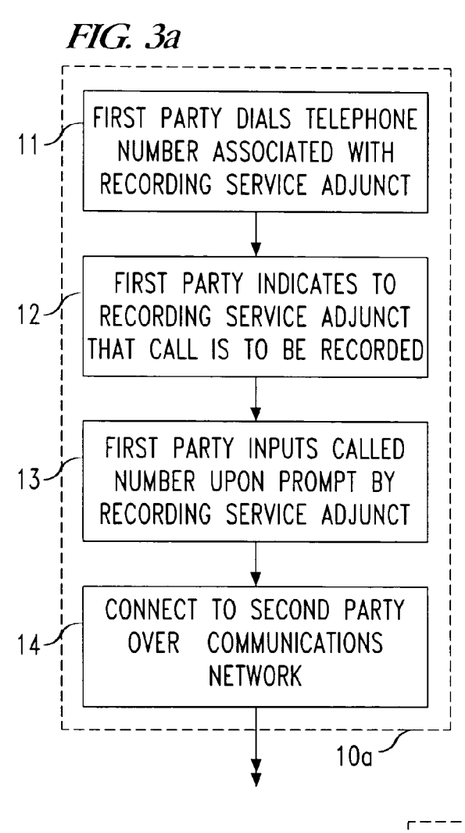
FIG. 3a sets forth one embodiment of the initial step of the inventive method.

The first party then dials the telephone number of the second party, upon a prompt from the recording service adjunct, as shown in step 13. The recording service adjunct 150 then causes a connection between the first and second parties to be established over the communications network (step 14).

Figure 3B:
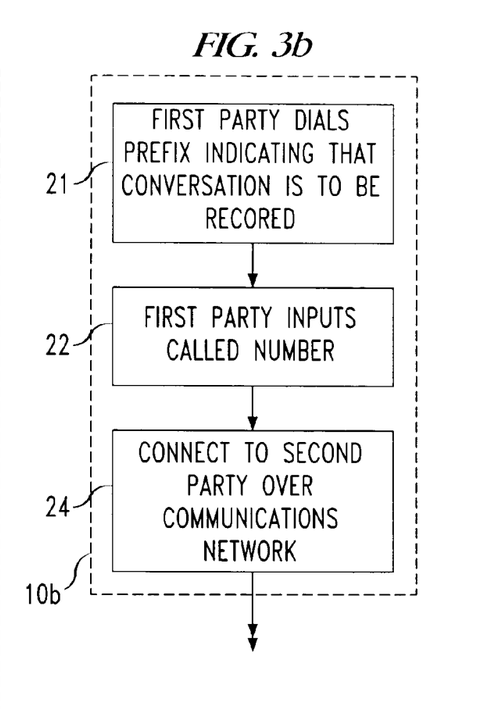
FIG. 3b sets forth another embodiment of the initial step of the inventive method.

In another embodiment shown in FIG. 3b, the first party may request that a conversation be recorded by dialing a code such as a "*" code (step 21) as a prefix to the called telephone number (step 22). Star codes are currently used by SS7 as commands for invoking various functions and transactions such as call waiting and call forwarding. In that embodiment, the connection to the recording service is made based on the prefix, and it is not necessary for the first party to initially dial a separate telephone number to connect to the recording service. The first and second parties are then connected (step 24) and recording is initiated as described below.

In contrast to the embodiments described in connection with FIG. 3a and FIG. 3b, in the embodiment shown in FIG. 3c, the parties are connected before the first party requests that the conversation be recorded (step 10c). That embodiment is used, for example, in cases where one of the parties decides after a conversation is in progress that the conversation should be recorded. For example, an insurance company may call a party to discuss a case, and the party may decide during the course of the conversation that it is desirable to create his or her own record of the conversation. In that embodiment (step 10c), first and second parties are connected over the communications network (step 17), with either party initiating the connection. After the connection is initiated, the first party transmits a code such as a "*" code through the in-band signaling system that causes the network 100 to connect the first party to the recording service adjunct 150 (step 18). Once that party is connected with the recording service adjunct, he or she may then send a code through the signaling system requesting that the conversation be recorded (step 19). An embodiment such as that illustrated in FIG. 3c may require call supervision, which enables a network to detect such a recording request. In that case, the first party initially requests call supervision, which then permits the first party to later request that the call be recorded, if desired.

Returning to the method depicted in FIG. 2, the second party is informed by the system (step 30) that the call is to be recorded. The second party may, at this point, be given the opportunity (step 35) to terminate the conversation should he or she object to the conversation being recorded.

Figure 3C:
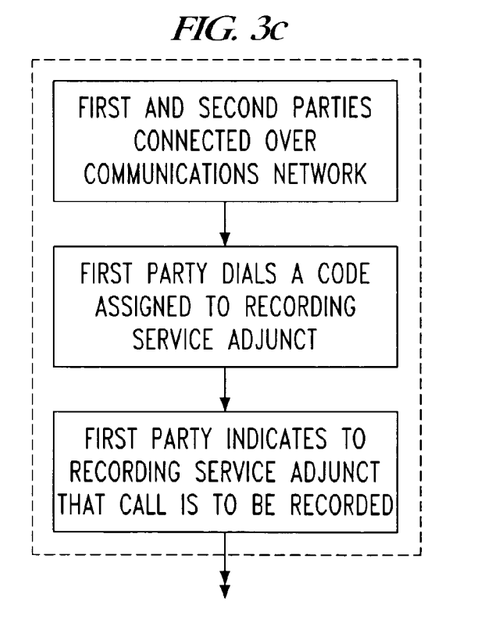
FIG. 3c sets forth another embodiment of the initial step of the inventive method.

In one version of the embodiment of FIG. 3c, recording is initiated when the first and second parties are connected. In that embodiment, the second party is informed that the recording is being made before the conversation commences. The second party indicates his or her acquiescence simply by proceeding with the conversation. Should the second party not wish to participate in the recorded conversation, he or she may terminate the call. Alternatively, the second party is prompted to indicate acquiescence by transmitting a code via the keypad or other means. For example, a prompt may instruct the second party, "Dial 1 if you agree to the conversation being recorded; otherwise dial 2." Should the second party indicate that he or she does not agree to recording the conversation, recording does not proceed but the conversation may be permitted to continue. In either case, a record of the second party's refusal to acquiesce to the recording may be made as documentation of that party's refusal.

In the case where the second party acquiesces to the recording, an audio signal representing the conversation is received by the recording service adjunct 150 (step 40) and a recording is made of the conversation (step 50). The recording may be stored digitally in a database associated with the voice/data recorder 155 (FIG. 1) or may be stored in analog form, as is well known in the art.

A recording record is established by the recording service for each telephone conversation that is recorded. That recording record may be a separate record from the AMA message record described above. Alternatively, the recording record may be combined with the AMA message record, or the two may be linked to create a single virtual record. An exemplary recording record 200, shown in FIG. 4, contains an audio recording of the conversation 210 as well as other information that may be associated with the recording for retrieval by the subscriber. The recording record is retained in the voice/data recorder database 155 (FIG. 1) under custody of the recording service provider.

Figure 4:
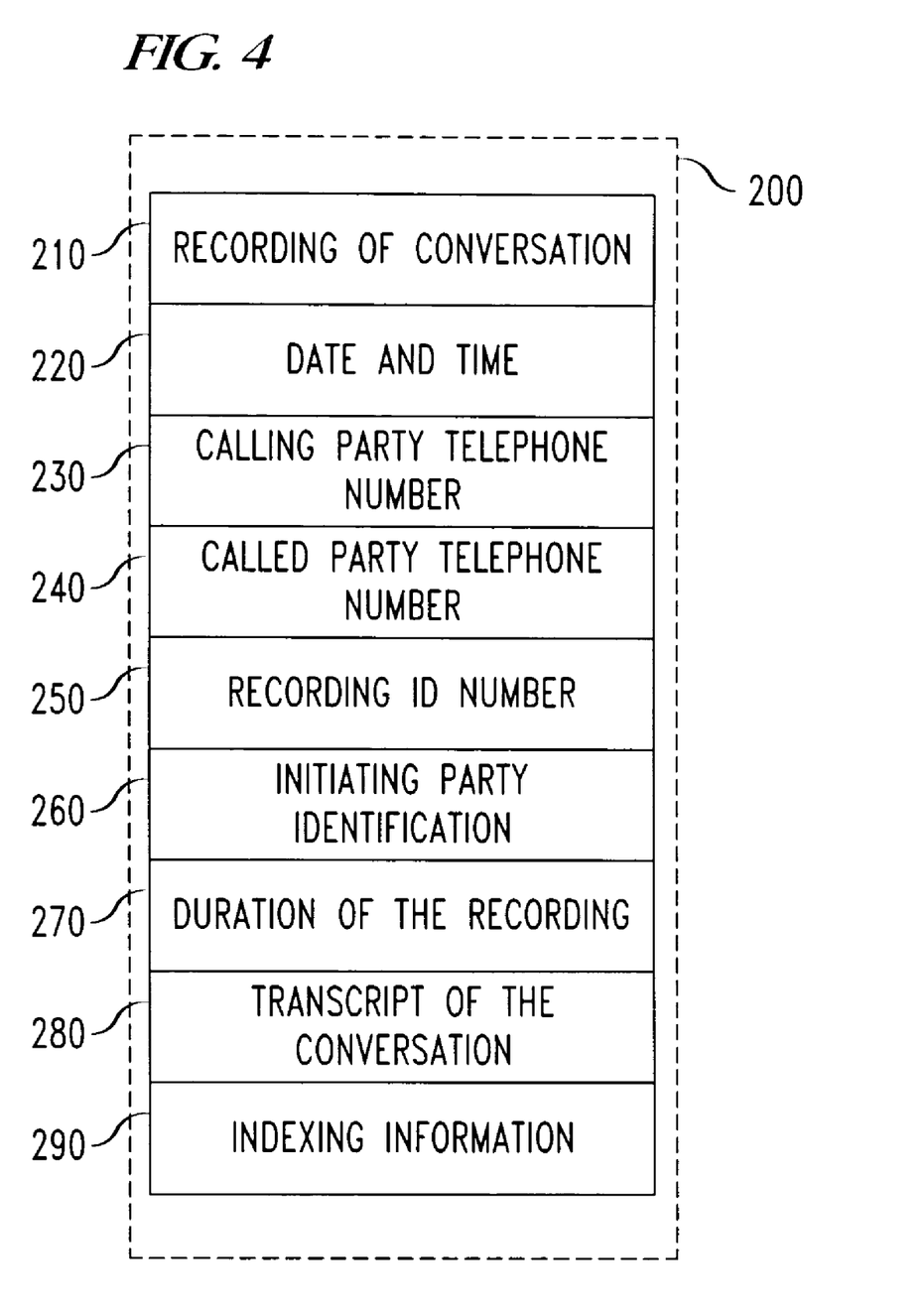
FIG. 4 sets forth an example of a recording record representing a recorded telephone call according to one embodiment of the present invention.

The date and time 220 are stored in association with the audio recording to show when the conversation took place. The date and time are determined automatically by the recording service using a reliable, internal or external clock having verifiable accuracy. Alternatively, the date and time recorded in the AMA message record may be used.

The identities of the calling station and the called station are stored in the recording record by storing, for example, the telephone number of the calling party 230 and the telephone number of the called party 240. Such information is generally available to the recording service adjunct 150 (FIG. 1) through the digital SS7 network 122, 132 as Automatic Number Identification (ANI) or Calling Line Identification (CLID) information. The identities of the called and calling stations provide important authentication information that may be automatically and reliably obtained and stored with the audio recording.

The recording service assigns a unique identifier 250, e.g., a recording ID number, to each particular recording record. The identifier is used for retrieval of the audio recording and associated information by the party that requested the recording. The identifier may also be used to track a chain of custody of the recording record for authentication purposes. The unique identifier is communicated to the party for the party's records and for later use in retrieving the recording. That may be done through the audio connection at the time the recording is made, or may be subsequently sent to a prearranged email or postal address, or by other means.

Identification information 260 about the party that requested the recording is also placed in the recording record 200. The identification information may be used to limit access to the recording to the party and those authorized by the party.

Information derived from the recording itself may also be stored in the recording record. For example, the duration of the recording 270 is useful for authentication and for record-keeping and billing purposes. A transcript of the recording 280 may be generated using known voice-recognition techniques or manual methods and stored in the recording record 200. From the transcript, additional information such as the topic of conversation or the spoken language may be derived and stored in the recording record. That information may be made available in written form.

Furthermore, indexing information 290 may be stored with the recording to facilitate playback and to enable a party to access clips of the recording or predetermined points within the recording. For example, indexing information may be placed at predetermined time intervals in the recording. The recording may be indexed based on certain keywords or based on user-defined indexing marks within the recording. The indexing marks are later used to facilitate retrieving portions of the recording.

Once a recording record of the conversation is stored, an authorized party may retrieve that record in various forms. For example, the party may listen to the audio recording of the conversation by connecting over the communications network 100 to the recording service adjunct 150 and ordering the recording using the unique identification number 250. The service may include the capability to add another party to the call during playback. An audio recording may alternatively be accessed by the party using the Internet or another computer network, in which case the recording is played back as a data stream or is transmitted as an audio file for later playback.

Alternatively, a written recording record of the conversation and/or associated data may be ordered by mail, through the network 100 or through another network such as the Internet. The written recording record may contain some or all of the information described above. Additionally, the written recording record may contain authentication indicia identifying the recording service provider as the custodian of the record and stating that the record has been in custody since its creation. Alternatively, if another entity is storing the recording record, a chain of custody may be described. By maintaining the record under its own custody or under the custody of a trusted delegate, the recording service provider provides additional value in being able to authenticate the recording record. Because custody is never with an interested party, the recording record is more useful in dispute resolution.

The recording service may provide a searching facility for locating a given recording record among a plurality of records. For example, an authorized party may use a search facility to search the recording records 200 for one containing a certain called telephone number 240 or calling telephone number 230, or a certain date 220, or a keyword in the transcript 280. The party would be permitted to search and review only those recording records having an identification 260 naming that particular party.

The period of time for which a recording record is retained may be fixed by the recording service or may be adjusted by the subscriber. The recording service may bill the subscriber based on storage time and the size of the file. The customer may also have the ability to delete a recording record.

In one embodiment of the invention, the recording service may be configured to automatically record telephone conversations meeting certain pre-defined criteria. For example, all incoming calls may be recorded, or all outgoing calls may be recorded. A subscriber may alternatively wish to record all incoming and outgoing calls transacted with a certain telephone station set or a certain area code or may wish to record all calls received during a particular time interval during the day. In another example, all calls except those coming from specified telephone station sets are recorded. The recording service of the invention permits a subscriber to configure the system to perform such recording automatically.

Figure 5:
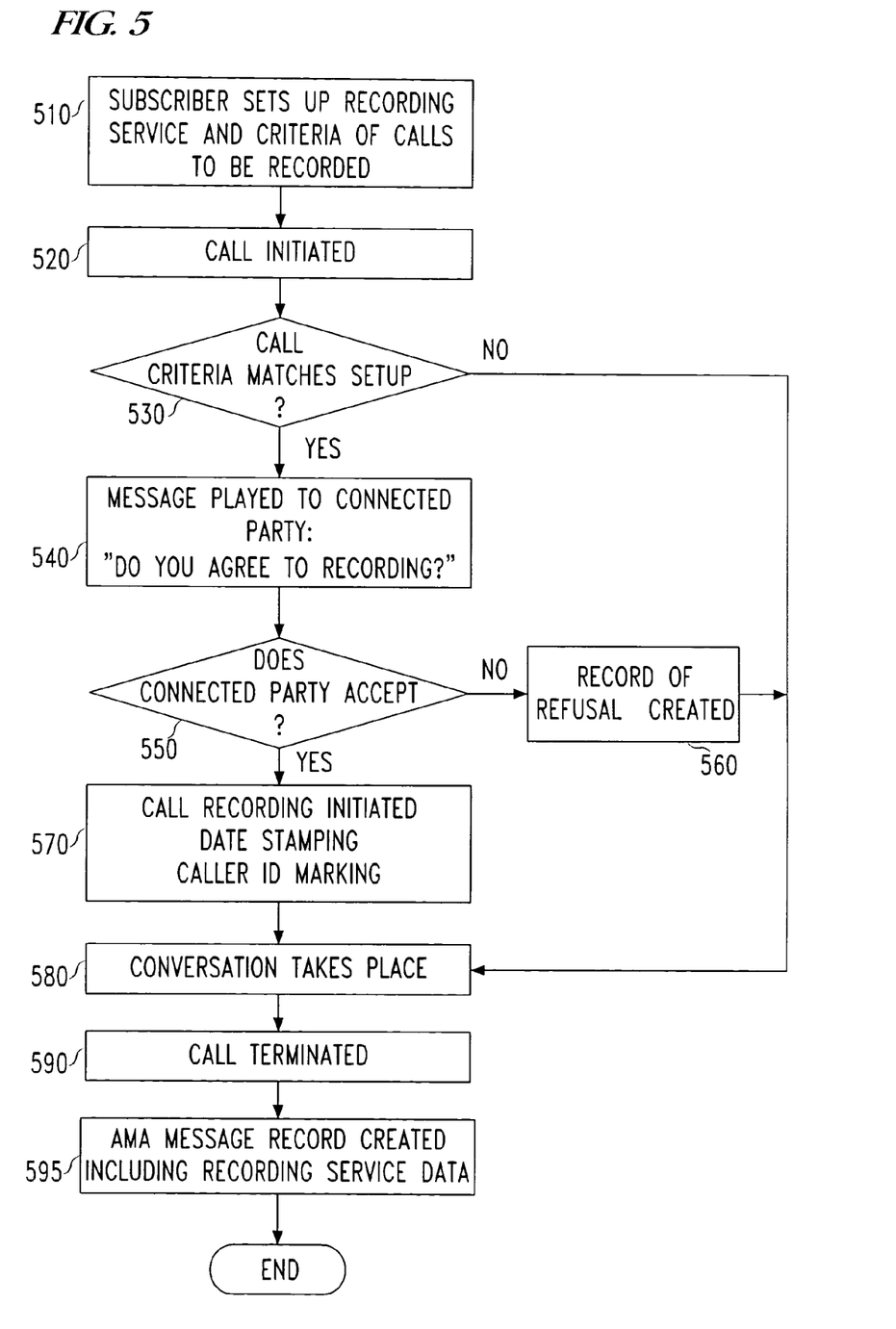
FIG. 5 sets forth a diagram of a communication recording method illustrating another embodiment of the present invention.
Figure 6:
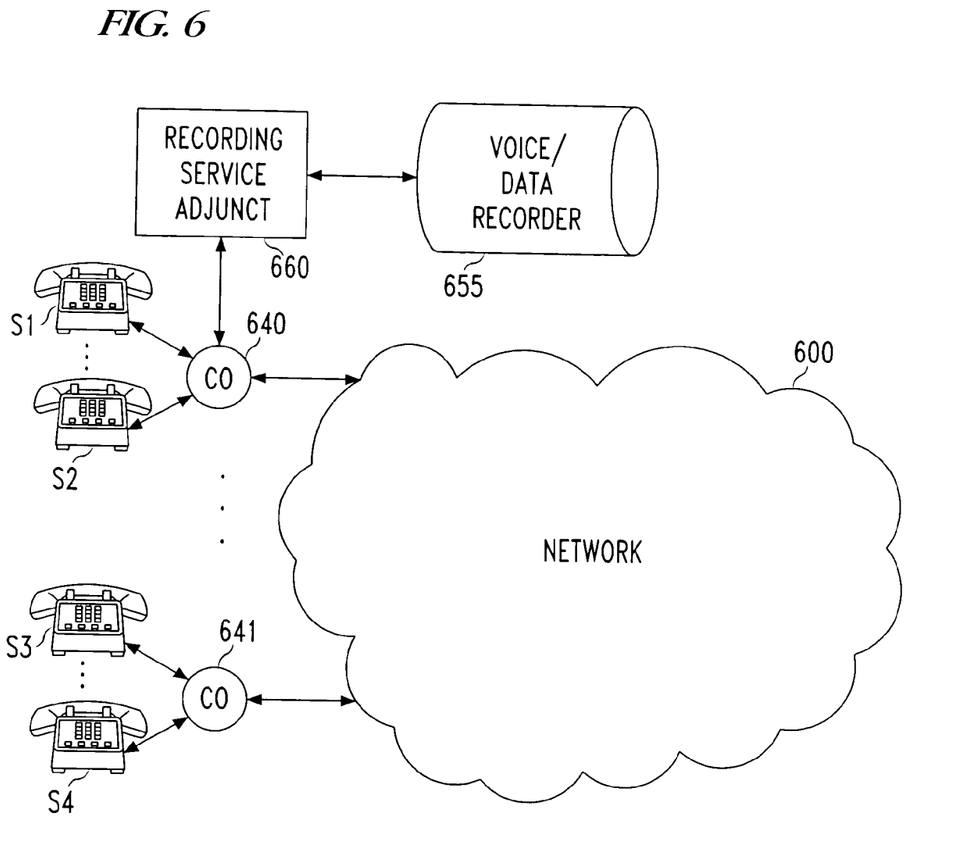
FIG. 6 sets forth an example of a system architecture illustrating another embodiment of the present invention.

In a method shown in FIGS. 5 and 6 for automatically recording telephone calls according to predefined criteria, a party in step 510 first sets up the recording service to record particular calls automatically. This is done by establishing one or more criteria for testing whether a given call is to be recorded. Those criteria are described by example above. The criteria may be stored for access by a recording service adjunct 660 (FIG. 6) associated with a central office 640 of the particular subscriber telephone station set S1 requesting the recording service. The criteria may alternatively be stored by a recording service adjunct located at another point within the long distance network 600, where the criteria are accessed through the network by the central office 640.

When a call involving station set S1 is initiated (step 520, FIG. 5), the recording criteria for that station set are accessed by the network and compared to the actual data associated with the connected call (step 530). If the criteria do not match the call data, the conversation proceeds (step 580) without being recorded.

If the criteria match the call data, then the party connected to station set S1 ("the connected party") is notified of the recording as described above, either before or after recording begins. For example, as shown in FIG. 5, a message is first played to the connected party informing the connected party that the conversation is to be recorded and giving the connected party an opportunity to refuse participation in the recorded conversation (step 540). If the connected party refuses, then a record is retained of that refusal (step 560) and the conversation proceeds without being recorded (step 580). If the connected party agrees to recording the conversation, then call recording is initiated (step 570). Additional authentication data, such as date and time and the called and calling telephone numbers, are stored in association with the conversation. After the conversation takes place (step 580) and terminates (step 590), the recording record is closed and logged, and a message record such as an AMA message record is created (step 595). The message record includes recording service data; for example, the message record may include a record that the recording service was used (or refused) during the call.

Figure 7:
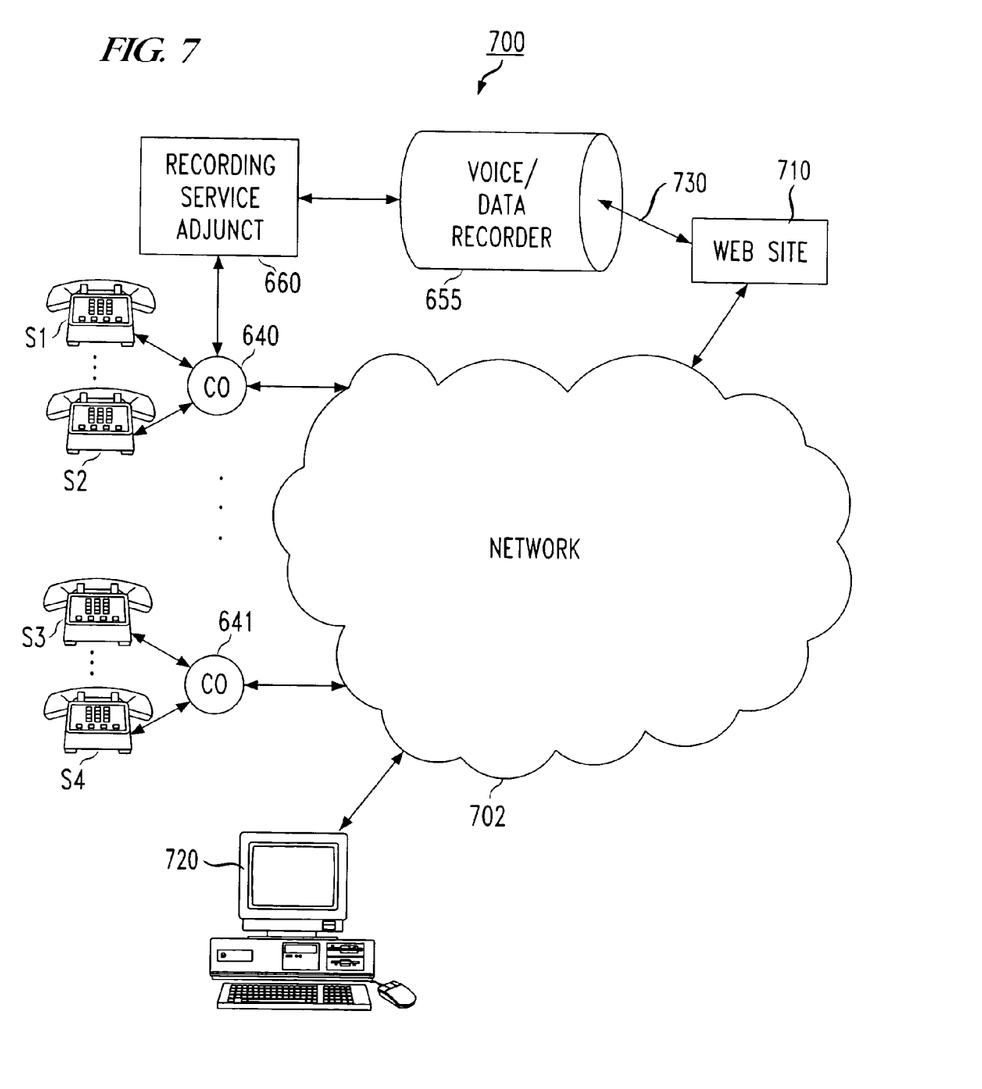
FIG. 7 sets forth an example of a system architecture illustrating another embodiment of the present invention.

An exemplary system 700 for recording a telephone conversation in accordance with another aspect of the present invention utilizes a network 702 and a web site 710 coupled to the network 702, as shown in FIG. 7, where like reference numbers represent like elements of FIG. 6. The network 702 can include a public switched communications network, connections to and support for Internet service, and support for Voice over Internet Protocol (IP) (VOIP).

The calling party communicates with the web site 710 through a terminal 720 coupled to the Internet. The terminal 720 may be, but is not limited to, a personal computer, a personal digital assistant (PDA), a web-enabled wireless phone, and a VoIP enabled telephone set.

The web site 710 is coupled to a voice/data recorder 655 similar to the voice/data recorder 155 of FIG. 1. It will be appreciated by those of ordinary skill in the art that the web site 710 can be provided by a server running on a separate processor coupled to the network or a server integrated within the network 702 or the recording service adjunct 660. When operated in conjunction with the terminal 720, the subscriber station S1 does not require any special signaling capability. The web site 710 controls the conference connection between the calling party and the called party which is accomplished using a conference bridge or a three-way calling feature within the network 702. In one embodiment, the system 700 is implemented using Voice over Internet Protocol (IP). In one embodiment, the network 702 provides a toll free phone number for access by the calling party to the Web site 710.

Figure 8:
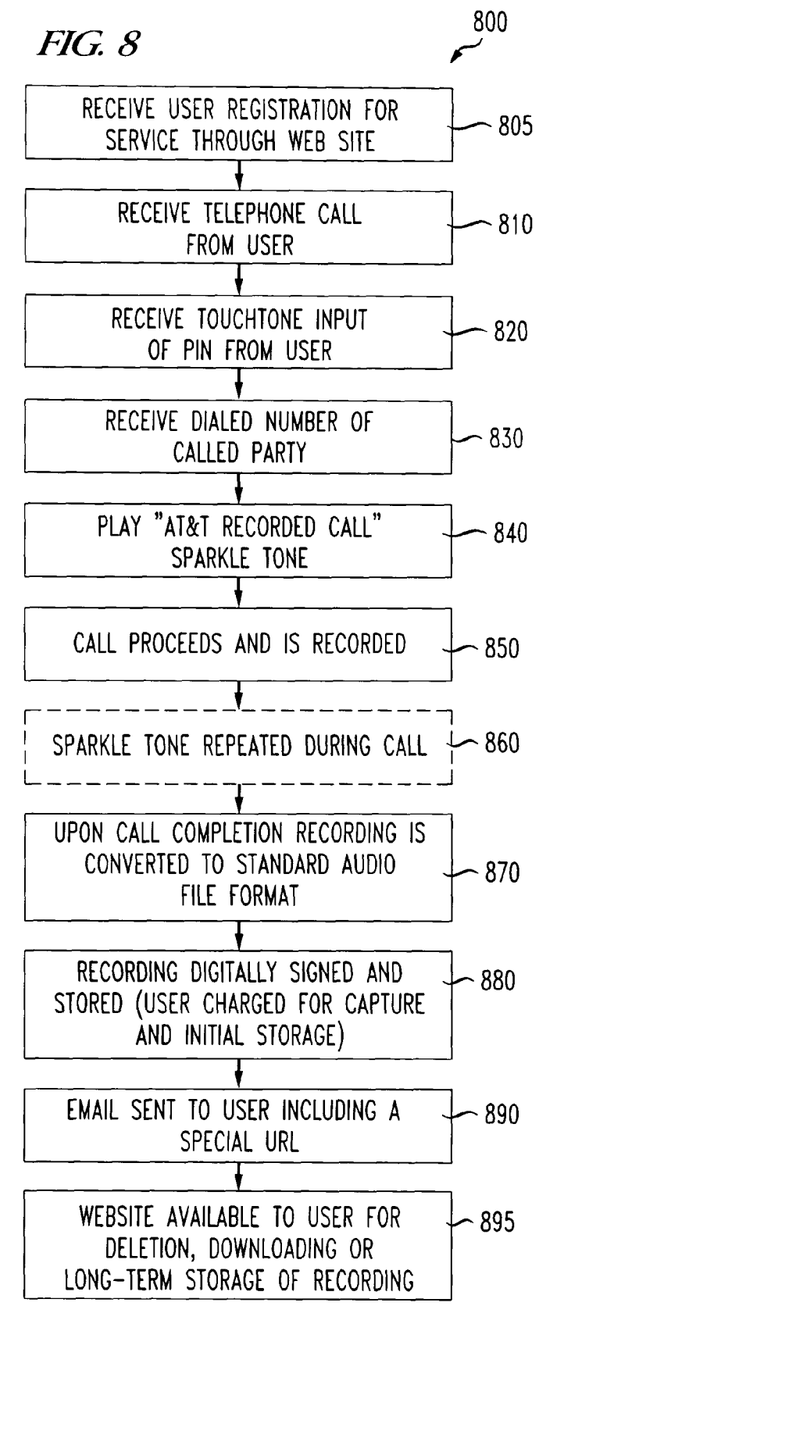
FIG. 8 sets forth a diagram of a communication recording service method illustrating another aspect of the present invention.

A method 800 for providing the service in accordance with the present invention is shown in FIG. 8 and will be described herein with reference to that Figure and FIG. 7. A user intending to use the service of the invention registers using a terminal having access to a Web site 710 hosted or otherwise provided by the service provider (step 805). The user provides at least billing information and an email address to the service provider, receives a login and password for use in retrieving recorded phone calls, and is assigned a personal identification number (PIN)-type number for use in making a recorded phone call. Additionally, the Web site 710 provides instructions on how to place a call and initiate the recording service.

To use the service, a registered user (i.e., the calling party) dials a telephone number to access the service provider (step 810). For example, the user may dial 1-800-2-RECORD to initiate a recorded telephone call. Once the user is connected to the service, the service prompts the user to enter the assigned PIN using the telephone touch pad (step 820). The user is prompted by the service to enter the telephone number (step 830) of the intended called party. The service then connects the user and the called party. In one embodiment, the service parks the first call and calls the intended called party. When the intended called party answers, the service connects both calls with a conference bridge or alternatively with a three-way calling feature. The service then bridges the call to the recording service adjunct 660 which is controllable by the Web site 710.

In step 840, the service plays a recorded message informing the user and the called party that the conversation is being recorded. In a preferred embodiment of the invention, an AT&T Sparkle Tone® message is played to the parties. The message is designed to give the called party notice that the call is being recorded, and the message may be repeated (step 860) periodically during the call for that purpose. The call proceeds and is recorded, either to an analog medium or digitally at the recording service adjunct 660.

Upon completion call of the call, the recording is converted (step 870) to a standard digital audio file format, such as wav format, MP3, Windows Media™ or RealAudio®. The file format, sampling rate and other parameters are selected to provide a recording of fairly high quality. Additional information, such as a date stamp, phone numbers, identities of the connected parties, etc., are added to the audio file using a text-to-speech capability, and the audio file is digitally signed by the service provider (step 880). The service provider may also perform a hash function or other authentication technique on the resulting file and store the results for later authentication. A digital certificate providing a public key as part of a public key infrastructure (PKI) associated with the service provider may be used in the digital signature process. The file including the digital signature is stored in storage accessible and protected by the Web site 710. At that point, the user may be billed for the capture and initial storage of the recorded conversation, using the billing information provided by the user in the initial registration process.

The service provider sends an email (step 890) to the user informing the user that the conversation recording is stored and available. The email includes a special URL directing the user to the stored recording on the service provider's Web site 710. At the Web site 710, the user identifies herself using the login and password provided when registering for the service. After logging in, the user can delete the recording, download it or store it long-term (step 895).

The downloaded file is signed in the format that the user will actually use it in. A user can therefore rely on the downloaded file itself as documentation of the conversation, using the stored hash function results from the service provider as proof of authenticity. In the case of long-term storage, the user can further rely on the service provider to show a chain of custody of the file.

The above service may be implemented as a component of the AT&T ECLIPSE virtual telecommunications network, a modular architecture based on IP. A description of the ECLIPSE platform is contained in U.S. Pat. No. 6,404,878, "Telecommunications Network System and Method," Michael Jackson and Pamela Zave, issued Jun. 11, 2002, and in pending U.S. patent application Ser. No. 09/644,128, "Routing Extensions for Telecommunications Network System and Method," Michael Jackson and Pamela Zave, filed Aug. 23, 2000, the subject matter thereof being incorporated in their entireties herein. In one embodiment, the telephone communication is routed into a Voice over IP (VOIP) domain in the ECLIPSE platform.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been described with particular emphasis on existing switched voice telephony network architecture. However, the principles of the present invention could be extended to other communications architecture, such as Internet telephony, facsimile, instant messaging or other data communications. Such an extension could be readily implemented by one of ordinary skill in the art given the above disclosure.

What is claimed is:

1. A method for making an authenticatable and retrievable recording of a voice communication for use by a service provider in a telecommunications system in which recording services are provided to communicating parties, comprising the steps of:

receiving a request for the recording service from a first communicating party;

verifying an identification number received from the first communicating party;

receiving a number for a second communicating party from the first communicating party;

establishing a connection for a communication over the public switched telecommunications system between first and second communicating parties;

playing an announcement to the second communicating party indicating that the conversation is being recorded;

before making the recording, receiving from the second communicating party an authorization to record the communication;

making a recording of the communication;

detecting the completion of the communication;

converting the recording to a standard audio file format;

digitally signing the audio file by the service provider;

including in the digitally signed audio file authentication information generated by the service provider including;
- a response from the second communicating party to the request for authorization;
- the time and date of the recording,
- telephone numbers associated with the communication, and
- a unique identification code;

storing the digitally signed audio file in a recording medium maintained by the service provider;

providing a protected website to the first communicating party for accessing the stored audio file and for at least one of playing of the audio file, deleting of the audio file, downloading of the audio file and long-term storage of the audio file; and sending e-mail including a URL for accessing the audio file containing authentication information to a predetermined address established by the first communicating party.

2. The method as claimed in claim 1, further comprising the steps of:
- providing a web site for registering the first communicating party using the communication recording service;
- receiving an e-mail address of the first communicating party;
- supplying a PIN to be used by the first communicating party as the identification number to be verified;
- receiving a method of payment; and
- providing a toll-free number for receiving requests for the recording service.

3. A telecommunications system for creating an authenticatable and retrievable recording of a telephone conversation between a first communicating party and a second communicating party comprising:
- a server hosting a web site which:
  - has a registration system operative to collect billing information and an e-mail address from the first communicating party and to provide an identification number to the first communicating party,
  - is coupled to a network operative to receive a request for recording services from the first communicating party; and
  - has a verification system to verify the identification number to the first communicating party;
- a voice/data recorder coupled to the network and to a public switched communications network, adapted to record conversations established in the public switched communications network, the voice/data recorder having
  - means for playing an announcement to the second communicating party indicating that the conversation is being recorded;
  - before making the recording, means for receiving from the second communicating party an authorization to record the communication
  - means for making a recording of the communication;
  - means for detecting the completion of the communication;
  - means for converting the recording to a standard audio file format;
  - means for digitally signing the audio file by the service provider;
  - means for including in the digitally signed audio file authentication information generated by the service provider including;
    - the response of the second communicating party to the request for authorization;
    - the time and date of the recording,
    - telephone numbers associated with the communication, and
    - a unique identification code;
  - means for storing the digitally signed audio file in a recording medium maintained by the service provider;
- a protected web site accessible to the first communicating party for accessing the stored audio file and for at least one of playing of the audio file, deleting of the audio file, downloading of the audio file and long-term storage of the audio file;
- means for sending e-mail including a URL for accessing the stored audio file containing authentication information to e-mail address collected from the first communicating party; and
- a switch that is IP-enabled and supports a Voice over Internet Protocol coupled to the network and to the public switched communications network, operable to provide a bridge among the first communicating party, the voice/data recorder, and the second communicating party.

* * * * *